Nov. 15, 1966  E. B. GORMAN  3,285,386
CAN DIVIDER

Filed May 26, 1965  2 Sheets-Sheet 1

INVENTOR.
EDMOND B. GORMAN

BY
ATTORNEYS

Nov. 15, 1966    E. B. GORMAN    3,285,386
CAN DIVIDER

Filed May 26, 1965    2 Sheets-Sheet 2

INVENTOR.
EDMOND B. GORMAN

BY
ATTORNEYS

United States Patent Office 3,285,386
Patented Nov. 15, 1966

3,285,386
CAN DIVIDER
Edmond B. Gorman, Campbell, Calif., assignor to Peco Corporation, Mountain View, Calif., a corporation of California
Filed May 26, 1965, Ser. No. 458,888
15 Claims. (Cl. 198—31)

This invention relates to can handling apparatus and more particularly to a magnetic can flow divider for selectively distributing cans from a single line to a plurality of lines.

Can dividers find numerous applications in the can making industry and in the handling of canned goods. Can dividers are employed, for example, where cans received from a machine which provides a high output are fed to a plurality of machines operating at a lower speed. Also, can dividers are used to divide cans prior to packing into boxes or cases. In the handling of canned goods the filled and labeled cans often are arranged in two or more layers or tiers, and the resultant stack of cans is placed in the packing case. In practice the cans from a single can line are divided, stacked and fed to the packing case. To assure that each stack is completely filled with cans and contains no voids, the cans must be equally divided when fed to the packing machine.

An object of this invention is the provision of a can divider which is capable of accurately and rapidly dividing the supply of magnetic articles such as cans which are fed thereto.

An object of this invention is the provision of a dividing apparatus for dividing a row of metal cans or the like moving in a single line, which divider includes a combined continuous magnetic flux field and pulsed flux field to accurately divide the cans delivered thereto.

An object of this invention is the provision of a magnetic diverter rail for use in can dividers or the like, which rail includes no moving parts.

These and other objects and advantages are obtained by use of a novel diverter rail which includes a pair of pole pieces magnetized to render one a north and the other a south pole. The rail is angularly disposed adjacent a conveyor upon which a row of magnetic articles such as cans are being conveyed. A magnetic shunt extends between the pole pieces adjacent the incoming end of the diverter to substantially short out the external unidirectional magnetic flux field thereat. With the flux field shorted out, the magnetic articles are not diverted when conveyed therepast.

A coil surrounds the magnetic shunt which coil is adapted to be supplied with current pulses. When the coil is pulsed, a strong external magnetic flux field is set up thereat between the pole pieces adjacent the shunt for attraction of the adjacent can into direct contact with the diverter pole pieces. By the time the pulse is terminated the can will have been moved by the conveyor along the diverter to a position where the can remains attracted thereto by reason of said unidirectional magnetic flux field. The diverted can moves with a rolling motion along the diverter rail under the combined influence of the magnetic attraction of the diverter and the propelling force of the conveyor. Preferably a magnetic shunt is also provided adjacent the discharge end of the diverter to reduce the magnetic attraction thereat, thereby facilitating the transfer of the diverted cans off the end of the diverter rail. A sensor is provided at the incoming line adjacent the input to the diverter rail, and the output from the sensor is employed to control the pulsing of the coil on the magnetic shunt in the desired manner. Suitable circuitry may be included for pulsing the coil as desired for, say every second, third, fourth, etc. can which is sensed. Thus, it will be seen that any desired division of the magnetic articles is possible. With this apparatus such division is extremely accurate and requires no moving parts in addition to the conveyor which is employed to move the cans.

In the drawings, wherein like reference characters refer to the same parts in the several views.

Figure 1:
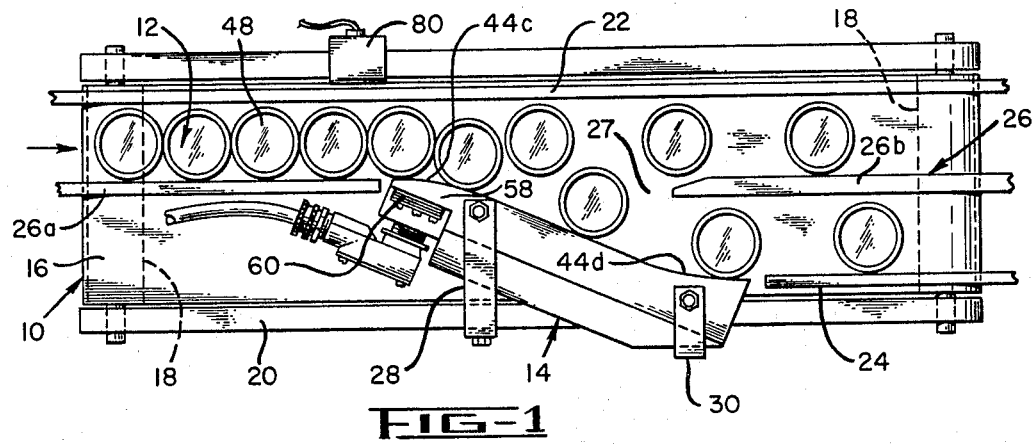
FIGURE 1 is a plan view of a magnetic can divider embodying this invention.

Reference is now made to FIGURE 1 wherein there is shown a can conveyor 10 to which cans 12 are fed one at a time from any suitable means not shown. For example the cans may have been filled, capped and labelled, and thence fed to the conveyor 10. A novel can diverter rail 14 embodying this invention is located on the conveyor 10. The diverter rail 14 and conveyor 10 together with suitable electronic circuitry described hereinbelow constitute a novel can divider.

The conveyor 10 may be of any suitable type and in the illustrated arrangement a belt type conveyor comprising an endless conveyor member or belt 16 extending over a pair of rollers 18 is shown. The rollers are supported on a suitable framework 20, and one of the rollers is driven by a suitable power source, not shown. Additional supporting means such as a flat plate or rollers, not shown, may be included for further support of the forward run of the conveyor belt if desired or required.

Side guide rails 22 and 24 and an intermediate guide rail 26 extend longitudinally of the conveyor member 16 and are fixedly supported thereat on the conveyor frame by means not shown. The center guide rail 26 is formed in two sections designated 26a and 26b with a gap designated generally 27 therebetween and adapted for passage of cans therethrough. The can diverter 14 extends between the trailing edge of the rail sections 26a and the leading edge of the one side rail 24. Any suitable means such as brackets 28 and 30 may be employed to support the diverter over the conveyor. The opposite ends of the diverter are formed with reversely curved sections which terminate in alignment with the rails 26a and 24 adjacent thereto. The cans 12, which are partially if not entirely formed of magnetic material, are fed to the conveyor inlet portion between the rail 22 and rail section 26a. Cans which are not attracted by the diverter 14 travel in a straight line past the gap 27 and into a first outlet between the rail 22 and rail section 26b. On the other hand, the cans which are attracted toward the diverter 14 and into engagement therewith roll therealong as they are propelled by the conveyor member 16. These diverted cans, therefore, pass through the gap 27 into the second outlet between the rail 24 and rail section 26b.

Figure 2:
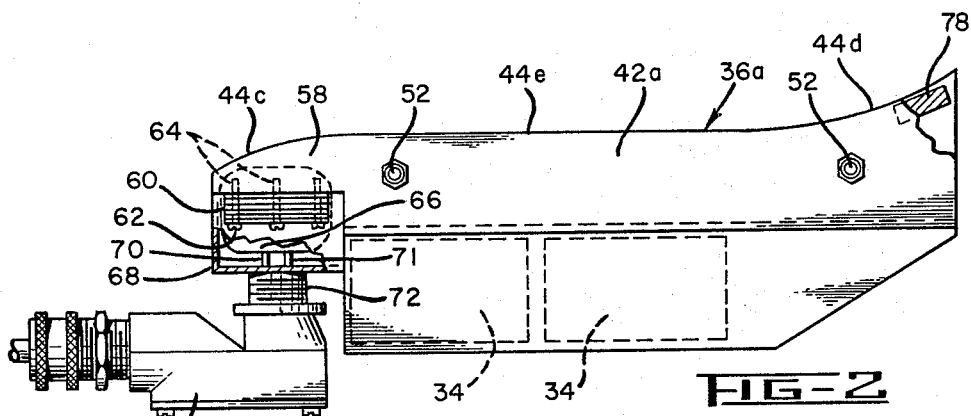
FIGURE 2 is an enlarged top view of a novel diverter rail included in the can divider shown in FIGURE 1.
Figure 3:
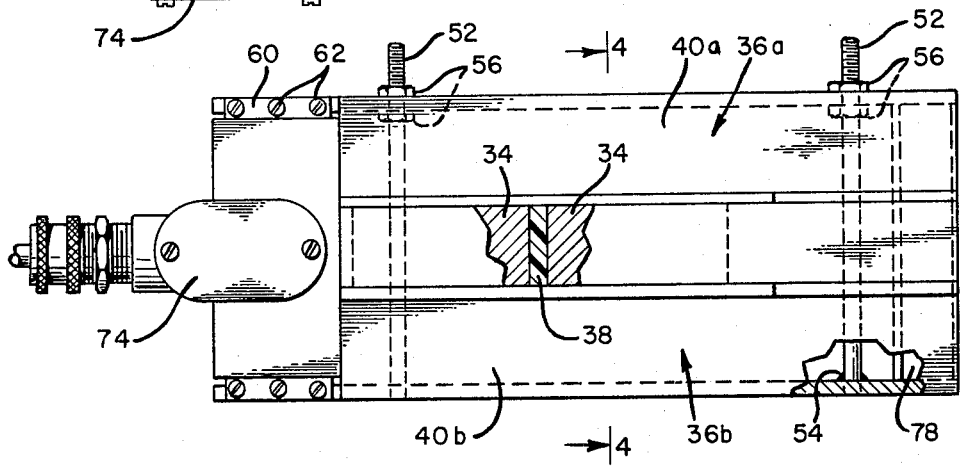
FIGURE 3 is a front elevational view of the diverter rail with parts shown broken away for clarity.
Figure 4:
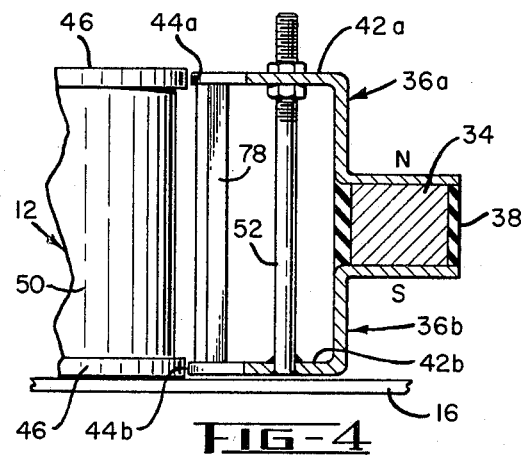
FIGURE 4 is a section view taken on line 4—4 of FIGURE 3.

Reference is now made to FIGURES 2, 3 and 4 wherein the diverter 14 is shown comprising permanent magnets 34 having generally parallel upper and lower flat polar surfaces. The magnets are provided with magnetic pole pieces designated 36a and 36b which may be attached thereto as by cementing or any other suitable means. The magnets 34 may be surrounded with a suitable non-magnetic material 38 such as plastic, if desired. The pole pieces 36a and 36b are formed with upwardly and downwardly extending vertical flanges 40a and 40b, respectively, the outer free ends of which flanges are bent in a parallel horizontal direction as at 42a and 42b. As seen in FIGURE 4, the outer free edges 44a and 44b of the pole pieces are spaced apart substantially the same distance as the can end seams or rims 46 which join the can ends 48 to the can body 50. The rims of the cans which are attached to the diverter engage the edges 44a and 44b of the pole pieces, and any printing or labelling (not shown) on the can body 50 remains free of the diverter during travel therealong.

The rail edges 44a and 44b as viewed in FIGURE 2 are convexly curved at the leading edge 44c thereof and concave at the trailing edge 44d, with the curved sections smoothly interconnected with a straight intermediate section designated 44e. The free ends of the curved edge sections 44c and 44d are positioned adjacent the ends of the rail section 26a and rail 24, respectively, with curved sections terminating in alignment therewith.

A pair of non-magnetic mounting bolts 52 made of stainless steel or the like interconnect the parallel end portions 42a and 42b of the pole pieces for the support thereof. The bottom of the bolts are secured as by welding 54 to the lower section 42b, and the threaded upper end of the bolts extend through holes in the section 44e and are attached by nuts 56 thereto. As shown in FIGURE 1 and described above, the threaded upper bolt ends are used to support the diverter over the conveyor belt 16 through the brackets 28 and 30.

The forward or upstream ends of the pole pieces 36a and 36b are cut away leaving only relatively narrow sections 58 on the parallel portions 42a and 42b along which the curved edges 44c are formed. By forming the pole pieces with relatively narrow upstream ends, the reluctance of the magnetic flux path thereat in somewhat increased. In accordance with this invention a magnetic shunt 60 is provided between the pole pieces 36a and 36b at the forward or upstream end of the diverter to reduce the external unidirectional magnetic flux field thereat. In the illustrated arrangement the shunt 60 is shown comprising a plurality of laminations which are fastened together and attached to the narrow end sections 58 of the pole pieces by capscrews 62 which extend through holes in the shunt and engage tapped holes 64 in the pole pieces. The shunt 60 may be formed of a solid magnetic bar in some applications.

A magnet coil or winding 66 (shown in FIGURE 2 within a housing 68) is wound upon the magnetic shunt 60, and lead wires 70 and 71 from the winding are brought out through a nipple 72 and elbow fitting 74 for connection to a current supply source described hereinbelow. In addition to serving to shunt the unidirectional magnetic flux field generated by the magnets 34, the shunt 60 functions also as a core piece for the winding 66, which winding is adapted to be energized by current pulses from the current supply source. With the winding 66 deenergized, the unidirectional magnetic flux field produced by the magnets 34 at the ends 58 of the pole pieces is shunted through the magnetic shunt 60 to reduce the external magnetic flux field thereat. Under such conditions the said external unidirectional magnetic flux field thereat is below a level which attracts the cans 12 traveling along the conveyor thereto. When the winding 66 is energized by a direct current pulse a strong external magnetic flux field is produced across the ends 58 of the pole pieces for attraction of an adjacent can 12 thereto. The intermittent magnetic flux field produced by the winding 66 within the shunt 60 is in opposition to the unidirectional magnetic flux field produced therein by the magnets 34. Consequently, an intermittent external magnetic flux field is produced at the forward end of the diverter which is in aiding relationship with the external unidirectional magnetic flux field thereat for attraction of an adjacent can thereto.

A second magnetic shunt 78 is provided adjacent the discharge end of the diverter to reduce the external magnetic flux field thereat. The shunt 78 may comprise a solid magnetic member which is welded at opposite ends to the rail sections 42a and 42b of the pole pieces. By reducing the external magnetic flux field at the discharge end, the cans will roll off the diverter by action of the conveyor belt without the need for following cans to back up thereagainst to push on the cans. Possible jamming of the divider is thereby avoided by the use of this magnetic shunt.

Figure 6:
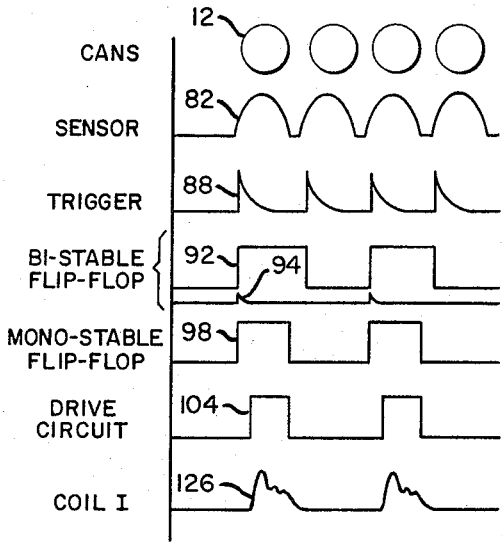
FIGURE 6 shows a series of waveforms which appear at various points in the circuit shown in FIGURE 5.
Figure 5:
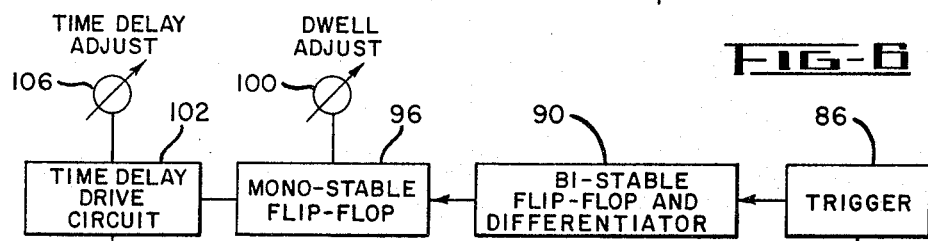
FIGURE 5 is a generally diagrammatic plan view of the can divider and showing an electronic circuit in combination block and schematic diagram form suitable for pulsing the diverter winding.
Figure 5:
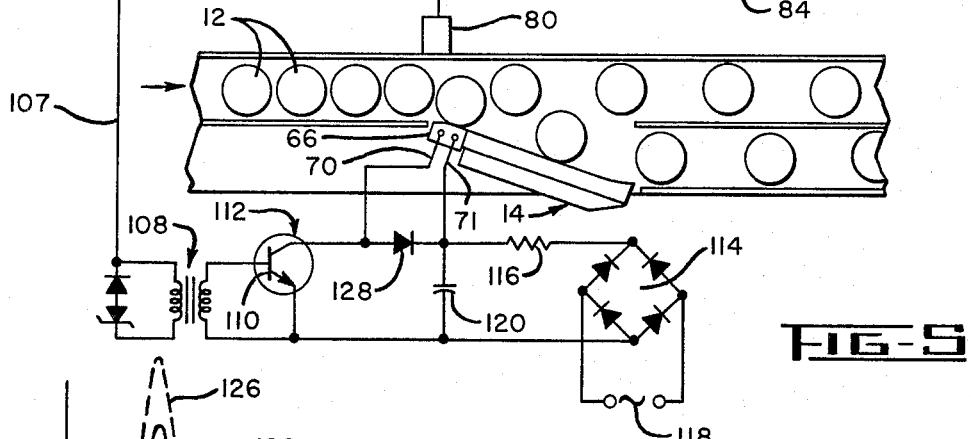

A suitable circuit for production of current pulses for pulsing the winding 66 to divide the flow of cans at the inlet portion of the divider into two outlet paths is shown in FIGURE 5 to which figure reference is now made. A sensing head 80 of any suitable type is located at the inlet portion of the divider adjacent the upstream end of the diverter 14. The sensor 80 may be of any suitable type such as a mechanical probe, a photo-electric device or magnetic sensing device. The sensor of the type shown in U.S. Patent No. 3,032,709 by Edmond R. Dudley issued May 1, 1962, entitled "Flow Control Device" may be employed. For this application, the sensing head is used to sense the existence or non-existence of cans 12 as they pass thereby. In FIGURE 6 waveform 82 illustrates the output from the sensing head 80 as cans 12 pass thereby. It will be seen that for each can passing the sensing head a single output pulse is produced. The output from the sensing head is fed through a conductor 84 to a trigger circuit 86 which is triggered to provide a pulse 88 whenever the sensing head output reaches a predetermined level. The trigger pulses 88 are, in turn, fed to a bi-stable flip-flop 90 having two stable operating conditions. The flip-flop 90 produces squarewave pulses 92 shown in FIGURE 6, and it will be seen that the circuit is switched to the opposite operating conditions for each trigger pulse 88 applied thereto.

The pulses 92 in the bi-stable flip-flop 90 are differentiated and clipped to provide trigger pulses 94 occurring at the leading edges of the squarewaves 92 as shown in FIGURE 6, which trigger pulses are fed to a mono-stable flip-flop 96 to trigger the same. The mono-stable flip-flop has a single stable operating condition and is switched to the unstable state upon receipt of an input pulse 94 thereto. The duratiton of the output 98 from the mono-stable flip-flop 96 may be controlled by means of a dwell adjust control means 100 for positioning the trailing edge of the pulse 98.

The mono-stable flip-flop output pulses 98 are then fed to a time delay drive circuit 102 comprising an amplifier and time delaying means and having an output waveform comprising pulses 104. The leading edge of the drive circuit output pulses 104 are delayed by said time delay means for a predetermined time following application of a pulse 98 to the input thereof, which delay may be adjustable and under control of a time delay adjust control means 106. The trailing edge of the pulses 104 coincide with the trailing edge of the mono-stable flip-flop output pulses 98. As seen in FIGURE 6 a drive circuit output pulse 104 having controlled leading and trailing edges is provided for every other can 12 which passes the sensing head 80. The trigger, flip-flops and drive circuits are all of well known design and no further description thereof is required for an understanding of this invention. Preferably, they comprise transistorized circuits which operate with bias potentials of about 17 volts.

The drive circuit output pulses 104 are fed through conductor 107 and a pulse transformer 108 to the base electrode 110 of a switching transistor 112. The transformer isolates the above-described low voltage circuitry from the high voltage circuit switched by the transistor 112. The transistor is in series circuit through the lead wire 70 with the diverter winding 66. Normally, the transistor is substantially cut off by application of zero emitter-base bias voltage thereto through the transformer secondary winding. The transistor is switched to a conducting condition upon application of a positive pulse 104 thereto from the drive circuit 102 through the transformer 108 which pulse provides a forward bias on the emitter-base junction thereof. The other lead wire 71 of the winding 66 connects to the positive terminal of a D.-C. supply source 114 through a current limiting resistor 116. In the illustrated arrangement the supply source comprises a bridge rectifier which is supplied by a suitable 110 volt A.-C. source 118. A large capacity storage capacitor 120 is connected across the power source 114 through the resistor, which capacitor is consequently charged to the peak power supply output of about 160 volts when the switching transistor 112 is cut off.

Figure 7:
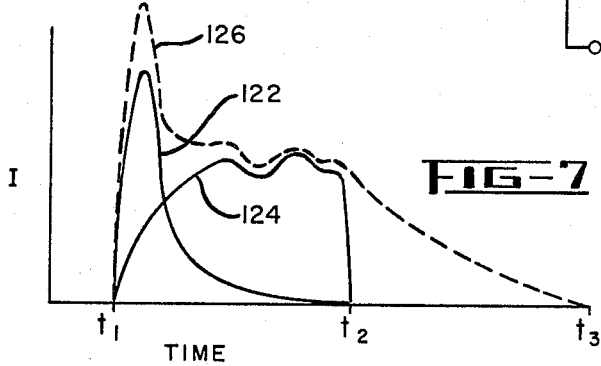
FIGURE 7 shows in greater detail a current pulse for the diverter winding.

When the transistor 112 is switched on by applicatiton of a forward emitter-base bias thereto from the drive circuit 102, the capacitor 120 discharges through the winding 66 and now conducting transistor. Since the output resistance of the transistor is substantially zero when the transistor is switched on, a large current pulse is supplied to the coil 66 by the discharge of the capacitor 120 therethrough. For purposes of explanation, the waveform 122 shown in FIGURE 7 illustrates the current supplied by the capacitor 120, with the transistor 112 being turned on at time $t_1$ and cut off at time $t_2$. The current supplied by the power supply 114 through the resistor 116 is illustrated by the waveform 124, and the resultant coil current waveform is identified by reference character 126 in both FIGURES 6 and 7. It will be seen that the resultant coil current pulse has an initial peak interval, supplied by the capacitor 120, followed by relatively lower current interval, as supplied primarily by the power supply 114 through the resistor 116. (Transients are produced by the discharge of the capacitor 120 through the coil 66 but do not adversely effect the operation of the diverter.) It will be seen that the coil current pulse has a steep leading edge. A diode 128 across the coil 66 is polarized to conduct when the voltage across the coil reverses polarity. When the switching transistor cuts off, the collapsing magnetic flux field of the coil 66 produces a coil current flow through the diode 128 which reduces to zero at time $t_3$. The time period between $t_2$ and $t_3$ may be shortened by any suitable means if required to prevent the same from extending into the next coil current pulse period. For example, a Zener diode may be included in series circuit with the diode 128 in the same manner illustrated in the primary circuit of the pulse transformer 108.

In operation, the conveyor belt 16 is driven at a constant speed whereby the rate at which the cans travel between the sensing head 80 and the forward end of the diverter 14 is known. Consequently, a fixed, known time interval lapses between the time a can is sensed by the sensing head and the same can reaches a position on the conveyor adjacent the input or upstream end portion 58 of the diverter. As described above, the unidirectional magnetic field provided by the magnets 34 is shunted by the shunt member 60 at the forward or upstream end of the diverter to reduce the external unidirectional magnetic flux field thereat. With the coil 66 deenergized, the can adjacent the section 58 of the diverter will continue to travel in a straight line along the conveyor without being attracted thereto, the attraction of the deenergized diverter 14 on the can directly adjacent the forward end 58 thereof being insufficient to attract the can thereto. As such can continues to travel along the conveyor the distance between the can and diverter 14 increases and the magnetic attraction supplied by the unidirectional magnetic flux field provided by the magnets 34 remains insufficient to attract said can to the diverter.

With the illustrated circuitry when the following adjacent can reaches a point on the conveyor directly opposite the forward end 58 of the diverter the coil 66 is pulsed and an intermittent magnetic flux field is set up thereat which attracts said can to the diverter. The current through the winding 66 and hence the ampere-turns thereof are maximum at the beginning of the current pulse (see FIGURE 7). Consequently, the magnetomotive force is maximum at the time that the can is spaced from the diverter pole pieces for strong magnetic attraction of the can to the diverter. As viewed in FIGURE 4, the can rims 46 engage the edges 44a and 44b of the diverter pole pieces. With the rims in contact with the pole pieces, a low reluctance closed magnetic circuit is provided through the can, the reluctance being much lower than when the can is spaced from the pole pieces with an air gap therebetween. The current pulse and hence the magnetomotive force decrease when the can has been attracted to the diverter pole pieces, but because the reluctance of the magnetic circuit is also reduced when the can engages the diverter pole pieces a strong magnetic force is maintained to keep the can in engagement with the pole pieces. The can rims roll along the diverter pole pieces under the combined driving force of the belt 16 and magnetic attraction of the diverter. When the current pulse terminates the unidirectional continuous magnetic flux field provided by the permanent magnets 34 attracts the can to the diverter and the diverted can will continue traveling with a rolling motion to the discharge end thereof. As mentioned above the magnetic shunt 78 at the discharge end provides a low reluctance closed magnetic flux path to reduce the magnetic attraction of the can thereto. The diverted can therefore simply leaves the diverter and travels along the conveyor belt between the rails 24 and 26b.

The time delay adjust means 106 (FIGURE 5) is set to position the leading edge of the coil current pulse for energization of the coil when the can to be diverted is adjacent the forward end of the diverter rail. The time delay employed will depend upon the distance along the conveyor between the sensing head 80 and the diverter, and the speed of the conveyor. The dwell adjust means 100 (FIGURE 5) is set to position the trailing edge of the coil current pulse to terminate the coil energization before the following adjacent can is attracted to the diverter. By this time the diverted can will have travelled far enough along the diverter to come under the influence of the unidirectional magnetic flux field provided by the magnets 34 for attraction thereof to the diverter. By way of example, a pulse width, say between 20 to 30 milliseconds may be employed on size 303 cans with the conveyor traveling at about 1 inch per 20 milliseconds. It will here be noted that the maximum pulse width is limited by saturation of the pulse transformer 108, and that the saturation point may be controlled by the external D.-C. resistance employed in the primary winding of the transformer.

Numerous advantages exist for the can divider of this invention. Except for the conveyor itself, no moving parts are required. The diverter rail and magnets are all stationary and are subject to a minimum wear. As mentioned above, the diverted cans roll along the diverter on the can rims and not along the side walls of the cans upon which labels or printing may be provided. The apparatus divides accurately and does not require a continuous supply of cans thereto in order to operate. That is, the apparatus does not rely upon the feeding pressure of succeeding cans to function properly. For any one can which passes the sensing head 80 the winding 66 either remains deenergized, whereupon the can continues straight through the divider, or the winding is pulsed whereupon said can is diverted. Whether the can is diverted or not depends upon the condition or state of the bistable flip-flop 90 and, as described above, this flip-flop remains in one steady state condition until triggered to the opposite steady state condition upon receipt of a trigger pulse. It will be apparent, therefore, that the spacing of the cans along the conveyor belt in feeding to the diverter will not effect the accuracy of the can division. With the illustrated circuit arrangement a coil current pulse 126 is produced by alternate pulses 82 from the sensing head 80 whereby every other can is diverted by the apparatus. The invention is not limited of course to a one-to-one division of the magnetic articles. For example, by simple circuit modifications involving the addition of cascade-connected dividing stages (e.g., additional flip-flops) every third, fourth, fifth, etc. can may be diverted by energization of the winding 66 upon passage of every third, fourth, or fifth can, respectively. Dividing circuits are well known to those skilled in the digital or non-linear circuit art and no showing thereof is required for an understanding of this invention. Also, with simple modification of the sensing device, and inclusion of a can "twister," the adjuster rail may be used in an arrangement for arranging all of the cans with their coded ends facing in one direction.

The invention now having been described in detail in accordance with requirements of the patent statutes various changes and modifications may suggest themselves to those skilled in this art without departing from the spirit and scope of the invention as defined by the claims appended thereto.

I claim:

1. A diverter for dividing a traveling row of magnetic articles comprising,
   a rail having an upstream and adjacent said row of articles and a downstream end spaced therefrom,
   first magnetizing means for magnetizing said rail to produce a first magnetic flux field,
   a low reluctance flux path at the upstream end of said rail for reducing the external magnetic flux field thereat, and
   second magnetizing means for intermittently magnetizing said low reluctance flux path for intermittent generation of an external magnetic flux field thereat for attraction of selected magnetic articles thereto.

2. The diverter recited in claim 1 including a second low reluctance flux path for said first magnetic flux field at the downstream end of said rail.

3. A diverter for dividing a traveling row of magnetic articles comprising,
   a pair of spaced rail members diverging from one side of the traveling row of magnetic articles,
   a flux generator for magnetizing said rail members to produce a unidirectional magnetic flux field therebetween,
   a magnetic shunt interconnecting said rail members adjacent the upstream end thereof to reduce the external unidirectional magnetic flux field thereat below a level which attracts said traveling magnetic articles thereto,
   and an intermittently operated magnetizing means for intermittently magnetizing said magnetic shunt in opposition to the unidirectional magnetic flux field produced therein by said flux generator to intermittently provide an aiding external magnetic flux field thereat for attraction of selected magnetic articles to said rail members.

4. The diverter defined by claim 3 wherein said magnetic articles comprise cans or the like, which travels in an upright position, the can rims of the selected cans engaging said rail members for rolling movement therealong.

5. A diverter for selectively diverting magnetic articles from a traveling row of such articles comprising,
   a rail having an upstream end located adjacent said row of articles and a downstream end spaced therefrom,
   intermittent magnetizing means to produce an intermittent magnetic flux field at the upstream end of said rail to selectively attract adjacent magnetic articles into engagement with said rail when energized, and continuous magnetizing means for magnetizing said rail to produce a continuous magnetic flux field which is insufficiently strong at the upstream end of said rail to attract said magnetic articles thereto and which is sufficiently strong at the downstream end to maintain said selected magnetic articles in engagement therewith.

6. The diverter recited in claim 5 wherein said rail comprises a pair of spaced pole pieces with a magnetic shunt therebetween at the upstream end of said rail,
   said continuous magnetizing means comprises a permanent magnet with opposite polar surfaces in engagement with said pole pieces, and
   said intermittent magnetizing means comprises a winding on said magnetic shunt adapted for energization by current pulses.

7. An article divider for dividing the flow of magnetic articles comprising,
   a conveyor for supporting magnetic articles for travel thereon,
   guide means for initially orienting said articles in a single row on said conveyor,
   a diverter rail with one end adjacent the outlet from said guide means,
   first magnetizing means for magnetizing said diverter rail to produce a first magnetic flux field,
   a low reluctance flux path on said diverter rail adjacent the outlet from said guide means to reduce the external magnetic flux field thereat, and
   a second magnetizing means for intermittently magnetizing said low reluctance flux path for intermittent generation of an external magnetic flux field thereat for attraction of selected conveyed magnetic articles thereto.

8. The divider recited in claim 7 including a second low reluctance flux path on said diverter rail adjacent the downstream end thereof for reducing the external magnetic flux field thereat.

9. An article divider for dividing the flow of magnetic articles comprising,
   a conveyor for supporting magnetic articles for travel thereon,
   means for orienting said articles in a single row on said conveyor,
   a pair of spaced rail members diverging from said row of articles,
   a flux generator for magnetizing said rail members to produce a unidirectional magnetic flux field therebetween,
   a magnetic shunt interconnecting said rail members adjacent the row of magnetic articles to reduce the external unidirectional magnetic flux field thereat below a level which attracts said conveyed magnetic articles thereto,
   and an intermittently operated magnetizing means for intermittently magnetizing said magnetic shunt in oppostion to the unidirection magnetc flux field produced therein by said flux generator to intermittently provide an aiding external magnetic flux field thereat for attraction of selected magnetic articles into engagement with said rail members.

10. The divider defined by claim 9 wherein said magnetic articles comprise cans or the like, which travel in an upright position on said conveyor, the can rims of the selected cans engaging said rail members and rolling therealong under the combined influence of the magnetic attraction of the pole pieces and the drive force of the conveyor.

11. An article divider for dividing the flow of magnetic articles comprising,
   a conveyor for supporting magnetic articles for travel thereon,
   means for orienting said articles in a single row on said conveyor, a rail having an upstream end located adjacent said row of magnetic articles and a downstream end spaced therefrom, intermittent magnetizing means to produce an intermittent magnetic flux field at the upstream end of said rail to selectively attract adjacent magnetic articles into engagement with said rail when energized, and continuous magnetizing means for magnetizng said rail to produce a continuous magnetic flux field which is insufficiently strong at the upstream end of said rail to attract said magnetic articles thereto and which is sufficiently strong at the downstream end to maintain said selected magnetic articles in engagement therewith, the single row of magnetic articles being divided into first and second rows with the articles in the first row being diverted by said rail and the articles in said second row being undiverted.

12. The divider recited in claim 11 wherein said rail comprises a pair of spaced pole pieces with a magnetic shunt therebetween at the upstream end of said rail, said continuous magnetizing means comprises a permanent magnet with opposite polar surfaces in engagement with said pole pieces, and said intermittent magnetizing means comprises a winding on said magnetic shunt adapted for energization by current pulses.

13. The divider recited in claim 12 including, a sensing device for sensing articles on said conveyor adjacent the upstream end of said rail, means under control of said sensing device for generating a current pulse each time a predetermined number of articles are sensed by said sensing device, and means connecting said current pulses to said winding for energization thereof.

14. A divider for dividing the flow of magnetic cans or the like comprising, a conveyor for supporting cans in an upright position for travel thereon, means for orienting said cans in a single row on said conveyor, a pair of vertically spaced rail members each with an upstream end adjacent said row of cans and a downstream end spaced therefrom, first magnetizing means for magnetizing said rail members to produce a unidirectional magnetic flux field therebetween, first and second magnetic shunts between said rail members adjacent the upstream and downstream ends thereof, respectively, a winding on said first shunt, a sensing device for sensing cans on said conveyor adjacent the upstream end of said rail members, pulse generating means for generating a current pulse each time predetermined cans are sensed by said sensing means, means for controlling the position and time duration of said current pulses for energization of said winding when the cans to be diverted are adjacent the upstream end of said rail members, the diverted cans being initially attracted to said rails by the magnetic flux field generated by said current pulses through said winding and remaining in contact with said rails following termination of said pulse by said unidirectional magnetic flux field, said diverted cans having rims in engagement with said rails and rolling therealong under the combined influence of magnetic attraction and the drive force of the conveyor.

15. The divider recited in claim 14 wherein the current pulses generated by said pulse generating means have an initial peak value interval followed by a reduced value interval.

References Cited by the Examiner
UNITED STATES PATENTS

| | | | |
|---|---|---|---|
| 2,743,001 | 4/1956 | Nordquist | 198—41 X |
| 2,821,300 | 1/1958 | Bofinger et al. | 198—41 X |
| 2,974,775 | 3/1961 | Stacey et al. | 198—31 X |
| 3,167,171 | 1/1965 | Harmon et al. | 198—41 |

EVON C. BLUNK, *Primary Examiner.*

R. J. HICKEY, *Assistant Examiner.*